Sept. 26, 1944.  J. M. LARSEN  2,358,814
TUBE CONNECTING DEVICE
Filed Dec. 14, 1939
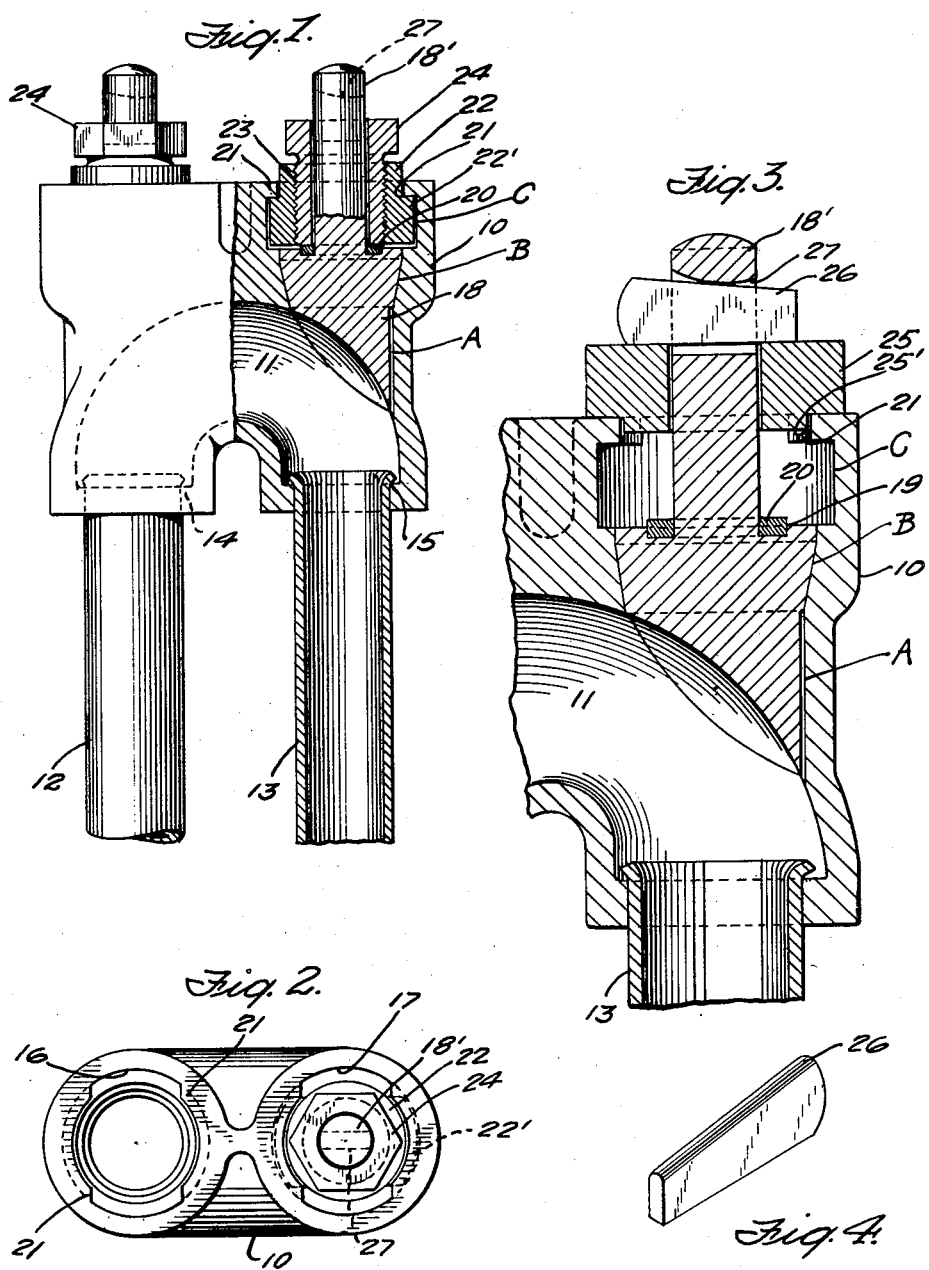
INVENTOR
JAMES M. LARSEN
BY
ATTORNEY Patented Sept. 26, 1944

2,358,814

UNITED STATES PATENT OFFICE 2,358,814

TUBE CONNECTING DEVICE

James M. Larsen, Brooklyn, N. Y., assignor to Foster Wheeler Corporation, New York, N. Y., a corporation of New York Application December 14, 1939, Serial No. 309,114

7 Claims. (Cl. 138—95)

This invention relates to tube connecting devices of the type commonly known as return headers, which are employed to connect adjacent ends of parallel tubes for series flow therethrough in various types of heat exchange apparatus. More particularly, the invention pertains to devices of this character which are adapted especially for use under relatively severe operating conditions as in tubular oil stills or similar heating structures wherein high temperatures and high pressures prevail.

The invention provides a return header of improved construction which is suitable for the use described, which affords smooth stream line flow of fluid passing through the header, and which is characterized by its strength and reliability. The invention further provides improved means for the ready removal of the several parts of the header assembly to facilitate inspection, cleaning, or renewal of the tubes.

The features and advantages which characterize the invention, will be understood from the following description when considered in connection with the accompanying drawing forming a part thereof and in which:

Fig. 1 is a view partly in elevation and partly in section, of a return header embodying the invention;

Fig. 2 is a top plan view of the header shown in Fig. 1 with some of the parts thereof removed;

Fig. 3 is an enlarged partial sectional view illustrating the manner in which parts of the apparatus may be removed, and Fig. 4 is a perspective view of a wedge member used with the apparatus.

Referring to the drawing, reference character 10 designates generally the body portion of a return header within which is a curved channel 11 forming a passage for fluid flowing through the header between two parallel tubes 12 and 13, the ends of which are secured in tube holes 14 and 15 respectively in an end wall of the header at opposite ends of the channel 11. Extending through the end wall of the header which is disposed oppositely to the wall having tube holes 14 and 15 and in axial alignment with the tubes 12 and 13, are hand hole openings 16 and 17 respectively. These hand hole openings are formed so as to provide an inner portion A, a carefully machined intermediate conical portion or plug seat B, and an outer cylindrical portion C of larger diameter.

Each of the hand hole openings is closed by a plug 18 having a relatively heavy elongated stem 18'. The inner end portion of each plug has a concave surface which is shaped to conform with the curved wall of the channel 11, and the main body portion of the plug is faced to correspond with the conical portion B of the hand hole opening. An annular groove 19 in the outer end of the body portion of each plug surrounds the stem 18' and receives a gasket or packing 20 of suitable material to provide a fluid-tight joint between the stem of the plug and the plug securing means. The outer portion C of each hand hole opening has oppositely disposed lips or projections 21, which provide a retaining means for a cylindrical yoke 22 having oppositely disposed projections 22' which are arranged to cooperate with the projections 21 to retain the yoke in position in the header as shown in Figs. 1 and 2, in the outer portion of the hand hole opening. The projections 21 and 22' are arranged and disposed so that the projections 22' will pass between the projections 21 when the yoke 22 is inserted in the portion C of the hand hole opening, and will be in alignment with the projections 21 after the yoke is given a quarter turn. The inner periphery 23 of the yoke is threaded and is arranged to receive a screw 24 which is mounted on the stem 18' of the plug.

The method of assembly of the several parts of the plug arrangement will be apparent. The plug 18 is first inserted in the hand hole opening and is seated with the concave surface of the inner part of the plug in alignment with the wall of the channel 11 as shown in Fig. 1. Yoke 22 is then placed over the stem 18' of the plug and is inserted in the outer portion C of the hand hole opening and is thereafter turned 45° to bring the projections 22' in vertical alignment with the projections 21. The screw 24 is then placed over the stem of the plug and is threaded into the yoke 22 and is turned down tightly against the gasket 20. Upon engagement with the gasket, the yoke will be moved upwardly against the projections 21 and the plug will be forced onto its seat.

A major problem heretofore long encountered with devices of the general character described, has been the difficulty of readily removing the hand hole plugs from the header for inspection, or for the cleaning or the renewing of the tubes. After extended periods of use, particularly when used in the heating or cracking of petroleum under high pressure, it has been found that the plugs frequently remain firmly seated or "frozen" after the various plug holding and securing means have been removed. This is due mainly to carbon deposits which become packed in the joint between the plug and its seat in the hand hole opening.

The present invention provides means whereby this difficulty is overcome. When it is desired to remove the plug from its position in the header, screw 24 and the yoke 22 are removed. A relatively heavy bearing plate 25 having a central aperture to freely receive the stem of the plug and a projecting portion 25' which is arranged to be received in the upper portion of the hand hole opening and functions to retain the plate in position when the plug is forced off its seat, is placed over the stem of the plug to rest on the header in the position shown in Fig. 2. A wedge 26 is then inserted in the narrow slot 27 in the outer end portion of the stem of the plug. When adequate force or pressure is applied to the wedge in the proper direction, the resultant force will act on the plug in a direction tending to remove it from its seat. The packed carbon or any other material tending to hold the plug on its seat will be quickly cracked or broken so that the plug may then be freely lifted from the header. The plug stem will not be damaged during this operation because of the relatively sturdy proportions of the plug stem.

It will be understood that a preferred embodiment of my invention has been disclosed and that changes may be made in the form, location and relative arrangement of the several parts thereof without departing from the principles of the invention. Accordingly, the invention is not to be limited excepting by the scope of the appended claims.

What is claimed is:

1. A return header having a tube hole and a hand hole opening oppositely disposed thereto and in alignment therewith, a plug for closing the opening having a stem, wedge receiving means associated with the stem, and means for applying a loosening force and also a withdrawing force to the plug comprising wedging means cooperating with said wedge receiving means.

2. A return header having a tube hole and a hand hole opening oppositely disposed thereto and in alignment therewith, a plug for closing the opening having a stem, wedge receiving means associated with the stem, means for applying a loosening force and also a withdrawing force to the plug comprising a wedge bearing surface associated with said opening, and wedging means cooperating with the bearing surface and the wedge receiving means.

3. A return header having a tube hole and a hand hole opening oppositely disposed thereto and in alignment therewith, a plug for closing the opening having a stem, wedge receiving means associated with the stem, means for applying a loosening force and also a withdrawing force to the plug, said loosening and withdrawing forces being substantially at right angles to one another comprising a wedge bearing member disposed over said opening, and wedging means cooperating with the bearing member and the wedge receiving means.

4. A return header having a tube hole and a hand hole opening oppositely disposed thereto and in alignment therewith, a plug for closing the opening having a stem provided with an aperture, and means for applying a loosening force and also a withdrawing force to the plug, said loosening and withdrawing forces being substantially at right angles to one another comprising a wedge extending into the aperture and bearing against a wall thereof.

5. A return header having a tube hole and a hand hole opening oppositely disposed thereto and in alignment therewith, a plug for closing the opening having a stem provided with an aperture, and means for applying a loosening force and also a withdrawing force to the plug, said loosening and withdrawing forces being substantially at right angles to one another comprising a wedge bearing plate disposed over the opening and having an aperture through which the plug stem extends, and a wedge extending into the first-mentioned aperture and bearing against a wall thereof and said plate.

6. A return header having a tube hole and a hand hole opening oppositely disposed thereto and in alignment therewith, a plug for closing the opening having a stem provided with an aperture, and means for applying a loosening force and also a withdrawing force to the plug, said loosening and withdrawing forces being substantially at right angles to one another comprising a wedge bearing plate disposed over the opening and having a portion extending thereinto, the plate having an aperture of greater diameter than said stem through which the plug stem extends, and a wedge extending into the first-mentioned aperture and bearing against a wall thereof and said plate.

7. A return header having a tube hole and a hand hole opening oppositely disposed thereto and in alignment therewith, said opening having a tapered plug seat, a plug adapted to be seated in said seat, said plug having a stem provided with an aperture, a wedge bearing plate disposed over the opening and having an aperture through which the plug stem extends, said aperture being of greater diameter than the stem, and a wedge extending into said first-mentioned aperture and bearing against a wall thereof, said wedge being adapted to exert a loosening force and a withdrawing force on said plug, said loosening and withdrawing forces being at substantially right angles to each other.

JAMES M. LARSEN.